April 14, 1970     L. SCHIKARSKI ET AL     3,506,770
APPARATUS FOR MELTING URANIUM AND PLUTONIUM DIOXIDES
Filed March 27, 1967
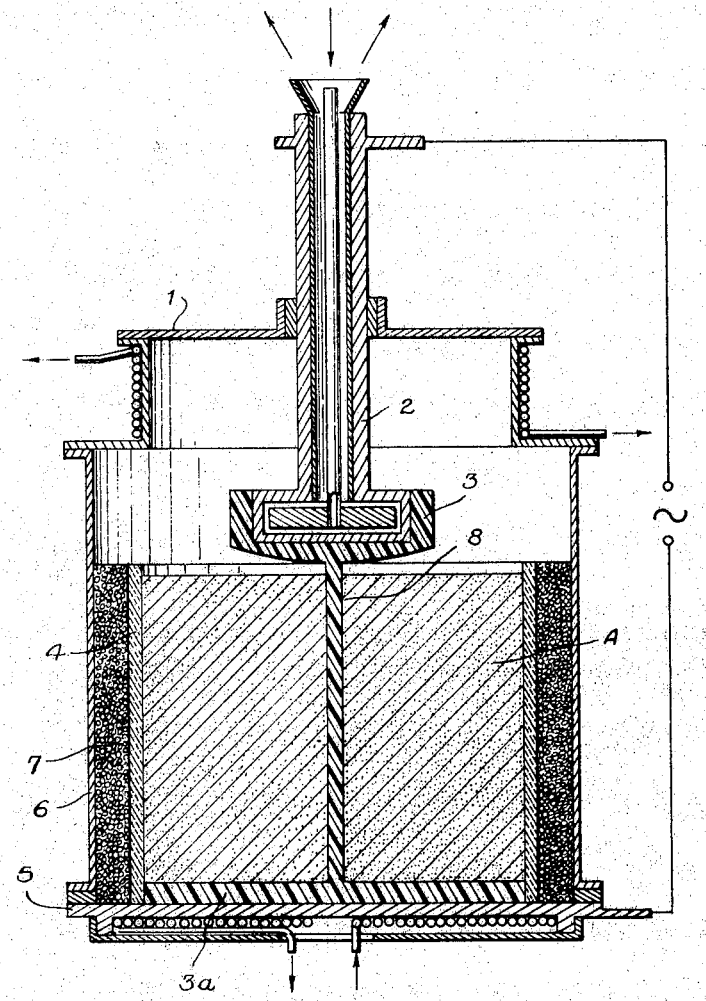
INVENTORS
*Lothar Schikarski*
*Hans-Jürgen Teiwes*
BY *Bailey, Stephens and Huettig*
ATTORNEYS United States Patent Office 3,506,770
Patented Apr. 14, 1970

3,506,770
APPARATUS FOR MELTING URANIUM AND PLUTONIUM DIOXIDES
Lothar Schikarski, Hanau am Main, and Hans-Jürgen Teiwes, Ruckingen, Germany, assignors to Nukem Nuklear-Chemie und -Metallurgie Gesellschaft m.b.H., Wolfgang, near Hanau am Main, Germany
Filed Mar. 27, 1967, Ser. No. 626,098
Claims priority, application Germany, Apr. 29, 1966, N 28,467
Int. Cl. H05b 7/18
U.S. Cl. 13—23                             3 Claims

ABSTRACT OF THE DISCLOSURE

A metal tank having a non-electrical ceramic lining is used instead of a graphite crucible to prevent short circuits between upper and lower electrodes when melting uranium and plutonium dioxides.

---

This invention relates to an apparatus for melting uranium dioxide, plutonium dioxide and mixtures of these oxides and in which the oxides in the form of powders are heated and melted by the direct application of an electrical current.

Heretofore, these finely ground oxides were melted by passing electrical current vertically through the center of the oxides to preheat this zone. This preheating first provides for a good passageway for the current through the center of the material which is almost non-conductive at room temperature and then with a further current increase a substantial portion of the material is softened and melted. A graphite crucible has been used for melting the oxides. Inasmuch as graphite is conductive, the danger exists of a short circuit being formed between the upper electrode and the upper edge of the graphite crucible which also serves as a counter electrode as well as a melting vessel.

In this invention, the disadvantage of the heretofore used apparatus is avoided in that a tank having a non-electrical conducting ceramic lining is used as the melting vessel instead of the graphite crucible. In addition to the fact that the apparatus of this invention is not subject to being interrupted by short circuits, the ceramic lining substantially reduces heat losses such as occur through a graphite crucible which has excellent heat conductivity.

The means by which the objects of the invention are obtained are described more fully with reference to the accompanying drawing which shows a cross-sectional view through the apparatus.

The upper portion 1 of the metallic housing holds a water-cooled electrode 2 and a graphite electrode 3 which is attached to a copper plate and is used as a current lead. The inner lining 4 of the tank is composed of a non-electrical conducting ceramic material so that the current flows only to the graphite bottom 3a which rests on a lower water-cooled copper electrode 5. The ceramic lining 4 is preferably composed of a mixture of 60% aluminum oxide and 40% silicon carbide, which mixture is very resistant to thermal shocks and has very low heat conductivity. In order to further improve the heat insulation of the melting zone in order to obtain a more favorable energy balance and increased yield, the space between the liner 4 and the lower portion of metal tank 6 is filled with granulated ceramic insulating material 7. The powdered oxides A in the tank are preheated by means of a graphite body 8 which extends vertically through the center of the tank. Body 8 is removed from the tank after the preheating of the oxides.

In this apparatus, in one melting process, it is possible to produce as much as 40 kg. of molten uranium dioxide.

Having now described the means by which the objects of the invention are obtained, we claim:

1. An apparatus for melting finely granulated oxide powder such as uranium dioxide, plutonium dioxide or mixtures thereof comprising metal tank means for holding the oxide, non-electrical conducting ceramic lining means for the inner wall of said tank, said lining means being composed of a mixture of 60% aluminum oxide and 40% silicon carbide, and electrical heating means extending vertically through the center of said tank for first preheating the vertical central zone of the oxide in said tank and then melting the oxide.

2. In an apparatus as in claim 1, further comprising a layer of granulated ceramic insulating material between said lining and said tank wall.

3. In an apparatus as in claim 1, further comprising a graphite plate bottom in said tank, and a water-cooled copper electrode engaging the lower outer surface of said bottom.

References Cited

UNITED STATES PATENTS 1,778,578  10/1930  Baily _____ 13—23
2,594,972   4/1952  Muehlenkamp _____ 13—18
3,387,079   6/1968  Hoppe et al. _____ 13—23

BERNARD A. GILHEANY, Primary Examiner
H. B. GILSON, Assistant Examiner